United States Patent
Basham et al.

(10) Patent No.: US 9,971,528 B2
(45) Date of Patent: May 15, 2018

(54) COLD STORAGE AWARE OBJECT REPLICATION

(71) Applicant: International Business Machines Corporation, Armonk, NY (US)

(72) Inventors: Robert B. Basham, Aloha, OR (US); Joseph W. Dain, Vail, AZ (US); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 15/057,469

(22) Filed: Mar. 1, 2016

(65) Prior Publication Data

US 2017/0255401 A1    Sep. 7, 2017

(51) Int. Cl.
*G06F 12/00*     (2006.01)
*G06F 13/00*     (2006.01)
*G06F 3/06*      (2006.01)

(52) U.S. Cl.
CPC .......... *G06F 3/0619* (2013.01); *G06F 3/065* (2013.01); *G06F 3/067* (2013.01); *G06F 3/0643* (2013.01); *G06F 3/0647* (2013.01)

(58) Field of Classification Search
CPC ............ G06F 11/1448; G06F 3/0619; G06F 11/1456; G06F 11/1458; G06F 11/1464; G06F 11/2094; G06F 17/30575
USPC ................................................ 711/161–162
See application file for complete search history.

(56) References Cited

U.S. PATENT DOCUMENTS

| | | | |
|---|---|---|---|
| 6,895,466 B2 | 5/2005 | Gibble et al. | |
| 7,054,887 B2 | 5/2006 | Kozina | |
| 7,330,948 B2 | 2/2008 | Deguchi et al. | |
| 8,090,917 B2 | 1/2012 | Haustein et al. | |
| 8,874,523 B2 | 10/2014 | Vickrey et al. | |
| 9,031,912 B1* | 5/2015 | Rogers | G06F 17/30082 707/640 |
| 2008/0091896 A1* | 4/2008 | Usami | G06F 11/1456 711/162 |
| 2009/0049262 A1* | 2/2009 | Kaiya | G06F 11/1456 711/162 |
| 2009/0254585 A1* | 10/2009 | Akers | G06F 17/30306 |
| 2011/0314239 A1* | 12/2011 | Kono | G06F 11/2094 711/162 |
| 2012/0254636 A1* | 10/2012 | Tsukamoto | G06F 1/30 713/300 |
| 2012/0303577 A1 | 11/2012 | Calder et al. | |

(Continued)

*Primary Examiner* — Sean D Rossiter
(74) *Attorney, Agent, or Firm* — Kunzler, PC

(57) ABSTRACT

An apparatus for data replication is disclosed. A method and computer program product also perform the functions of the apparatus. In one embodiment, an apparatus includes a replication module configured for replicating, in response to a determination that a received object corresponds to a storage policy, the received object to a data storage node. The apparatus also includes a tagging module configured for marking the received object with a file attribute indicative of the received object being excluded from migration to a cold storage device during the replicating, and removing the file attribute after the replicating. The apparatus may also include a migration module configured for migrating, in response to a determination that the file attribute has been removed, the received object to the cold storage device.

20 Claims, 6 Drawing Sheets

(56) References Cited

U.S. PATENT DOCUMENTS

| | | | |
|---|---|---|---|
| 2013/0275695 A1* | 10/2013 | Ponsford | G06F 11/1448 |
| | | | 711/162 |
| 2015/0052322 A1* | 2/2015 | Tsirkin | G06F 9/4856 |
| | | | 711/162 |
| 2015/0304306 A1* | 10/2015 | Ponsford | G06F 21/6218 |
| | | | 713/171 |
| 2016/0006922 A1* | 1/2016 | Boudreau | H04N 5/23206 |
| | | | 348/207.1 |
| 2016/0048430 A1* | 2/2016 | Bolik | G06F 11/1448 |
| | | | 711/162 |
| 2016/0179416 A1* | 6/2016 | Mutha | G06F 3/0619 |
| | | | 711/162 |
| 2016/0299709 A1* | 10/2016 | Somers | G06F 3/0619 |
| 2016/0316010 A1* | 10/2016 | Bar | H04L 67/1095 |
| 2017/0075620 A1* | 3/2017 | Yamamoto | G06F 3/0608 |
| 2017/0300254 A1* | 10/2017 | Mutha | G06F 3/0619 |

\* cited by examiner

COLD STORAGE AWARE OBJECT REPLICATION

FIELD

The subject matter disclosed herein relates to data replication and more particularly relates to cold storage aware object geo-replication.

BACKGROUND

Reliable backup of data is an important aspect of any computing system where loss of data would be detrimental to the system. For a backup system to be effective, at least one replica of the data should survive a failure, or data-destroying event, so that data can be recovered. Such failures may happen as a result of catastrophic events (such as terrorist attacks), extreme weather phenomena, large-scale network failures, power blackouts, and other similar events. To survive such events, data should be replicated on nodes that are unlikely to be affected by concurrent failures (i.e., failures affecting multiple system nodes simultaneously).

Recently, methods that replicate content across multiple nodes have been used. To ensure that a catastrophic event does not destroy the data, often times the multiple nodes are distributed across geographically diverse areas, in what is known as "geo-replication." These multiple nodes may be located very far away from each other (e.g., across countries or continents), increasing the cost and time to perform a replication. One technique to mitigate the cost and performance issue of geo-replication is to write data locally and then, post-process, disperse the data to object clusters in geographically different locations. However, these geo-replication techniques and systems improperly assume that all object clusters are formed of high speed storage devices.

SUMMARY

An apparatus for data replication that is cold storage aware is disclosed. A method and computer program product also perform the functions of the apparatus. In one embodiment, an apparatus includes a replication module configured for replicating, in response to a determination that a received object corresponds to a storage policy, the received object to a data storage node. The apparatus also includes a tagging module configured for marking the received object with a file attribute indicative of the received object being excluded from migration to a cold storage device during the replicating, and removing the file attribute after the replicating. The apparatus may also include a migration module configured for migrating, in response to a determination that the file attribute has been removed, the received object to the cold storage device.

In one embodiment, the data storage node comprises a plurality of data storage nodes, where each of the plurality of data storage nodes comprises at least one cold storage device and at least one primary storage device. In certain embodiments, at least two of the data storage nodes are geographically diverse from one another.

In one embodiment, the apparatus also includes a capacity module for determining a storage capacity of the primary storage device, and determining when a storage capacity threshold is reached. The capacity module may also determine when other replicating failures have occurred, such as connectivity issues between data storage nodes.

The replication module is also configured for overriding, in response to a determination that the storage capacity threshold is reached, the file attribute that is indicative of the received object being excluded from migration, and migrating the received object to cold storage. In this example, the migration module also migrates, in response to the overriding, the received object sequentially to at least one of the cold storage devices. Subsequently, the migration module retrieves the received object from the at least one cold storage device in response to a determination that the storage capacity is below the storage threshold. In one embodiment, the replication module also maintains a first copy of the received object in at least one primary storage device of a first node of the plurality of data storage nodes, and a second copy of the received object in at least one cold storage device of a second node of the plurality of data storage nodes.

A method for data replication, in one embodiment, includes replicating, in response to a determination that a received object corresponds to a storage policy, the received object to a data storage node, marking the received object with a file attribute indicative of the received object being excluded from migration to a cold storage device during the replicating, and removing the file attribute after the replicating, and migrating, in response to a determination that the file attribute has been removed, the received object to the cold storage device.

In one embodiment, the method also includes determining a storage capacity of the primary storage device, and determining when a storage capacity threshold is reached. The method also includes overriding, in response to a determination that the storage capacity threshold is reached, the file attribute that is indicative of the received object being excluded from migration, and migrating the received object to cold storage.

In other embodiments, the method includes migrating, in response to the overriding, the received object sequentially to at least one of the cold storage devices, and retrieving the received object from the at least one cold storage device in response to a determination that the storage capacity is below the storage threshold. In another embodiment, the method includes maintaining a first copy of the received object in at least one primary storage device of a first node of the plurality of data storage nodes, and a second copy of the received object in at least one cold storage device of a second node of the plurality of data storage nodes.

In one embodiment, a computer program product for data replication includes a computer readable storage device having program instructions embodied therewith. The program instructions, in some embodiments, are executable by a processor to execute the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
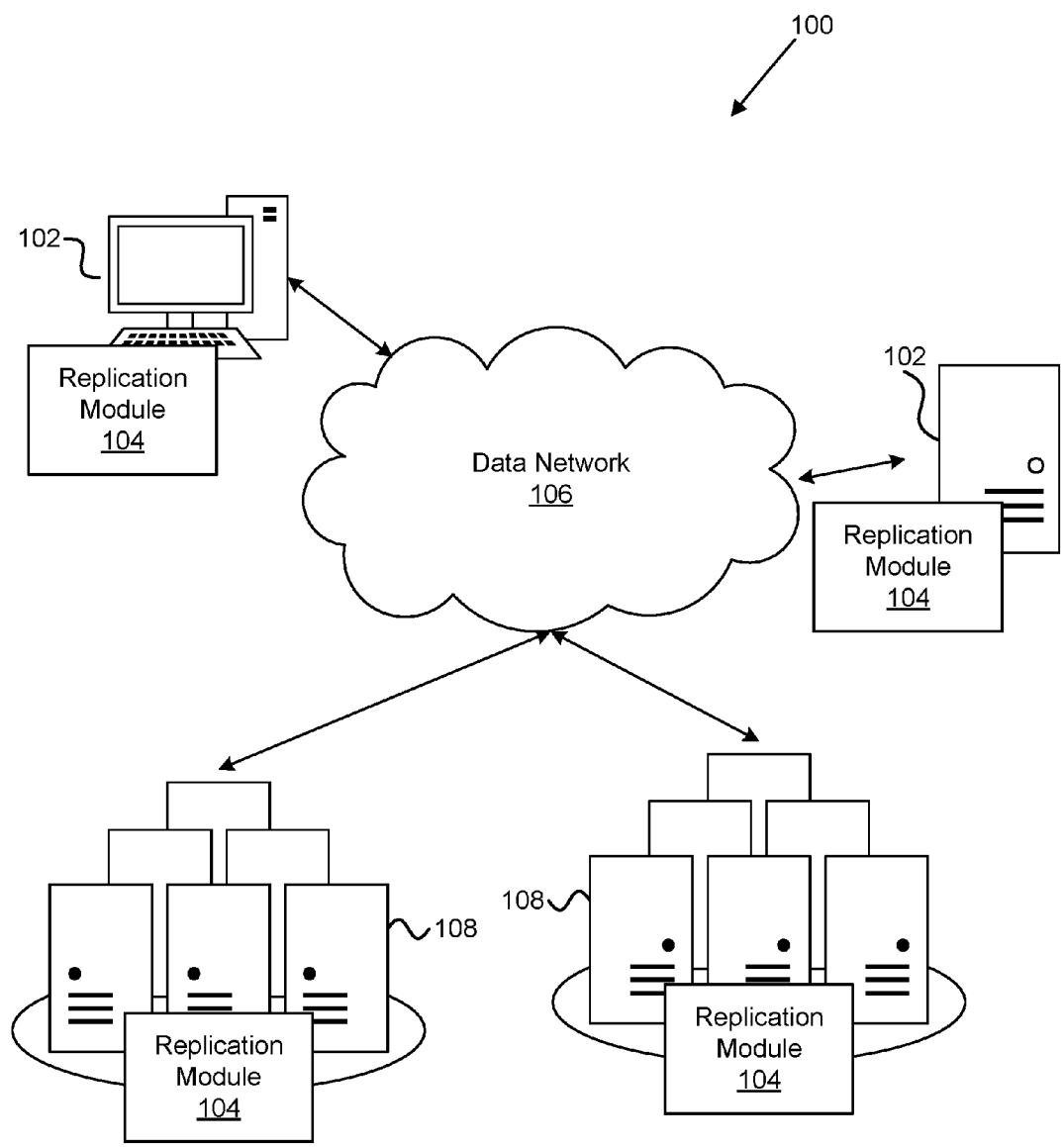
FIG. 1 depicts one embodiment of a system for data replication in accordance with embodiments of the present disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures Like numbers refer to like elements in all figures, including alternate embodiments of like elements.

FIG. 1 depicts one embodiment of a system 100 for data replication. In one embodiment, the system 100 includes information handling devices 102, data replication modules 104, data networks 106, and one or more data repositories 108. Even though a particular number of information handling devices 102, data replication modules 104, and data networks 106 are depicted in the system 100 of FIG. 1, one of skill in the art will recognize that any number or configuration of information handling devices 102, data replication modules 104, data networks 106, and data repositories 108 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handing devices 102 may include one or more of a server, a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to the data repositories 108 via a data network 106, described below. The information handling devices 102, in a further embodiment, are capable of executing various programs, program code, applications, instructions, functions, or the like, which may access, store, download, upload, and/or the like data located in one of the data repositories 108.

The data replication module 104 is configured to replicate data from a source information handling device 102 to at least one of a target information handling device 102 or a data repository 108. Data replication modules 104 of the source and target devices may communicate to handle the transfer of data from the source device to the target device. In a further embodiment, the replication module 104 maybe configured to replicate data between one or more data repositories 108. Stated differently, the replication module 104 may be configured to coordinate the transfer of data between data stores to ensure file consistencies across two or more data repositories 108.

As may be appreciated, the data replication module 104 may be used in any suitable data replication system 100. In certain embodiments, as described below with reference to FIGS. 2 and 3, the data replication module 104 includes multiple modules that perform the operations of the data replication module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

The data repository 108, in one embodiment, may comprise one or more servers, or other data storage devices, that include volatile and non-volatile storage media for storing data including various types of cold storage devices. As used herein, the phrase "cold storage" refers to any storage device that incorporates high capacity, low cost, and durability. Cold storage devices may have significantly slower response times as compared to so-called "primary storage" devices (i.e., SSD, HDD, etc.). Examples of cold storage devices include, but are not limited to, tape, and low-cost commodity hard disk drives.

The data may include documents, images, videos, audio files, metadata, or the like. The data may be stored in a file system, as objects, as blocks, and/or the like. The data repository 108 may be located in a data center either on the premises of an organization and/or in the cloud such that data is accessed via a data network 106 like the Internet. The data repository 108, in one embodiment, is the primary data storage point for one or more entities, applications, programs, and/or the like for storage and access of data used by the one or more entities, applications, programs, and/or the like. The data stored in the data repository 108 may be stored in a compressed format, e.g., the data may be compressed using various data compression methods such as data deduplication. The data repository 108, in one embodiment, is configured as a backup storage system, a disaster recovery system, a data restore system, and/or the like.

Together, the various data repositories 108 may comprise a cloud storage system, and in some embodiments a hybrid cloud storage system (e.g., a system including local and remote data repositories). For example, the local data repository 108 may be a private cloud storage system located on the premises of a company, and the remote data repository may be a public cloud storage system (e.g., Amazon S3®, Rackspace®, Softlayer® object storage, etc.). Workloads may be split between the devices of the local and remote data repositories 108 and may be split between the public and private clouds, workloads and/or data may be manually or automatically shifted between the public and private clouds, and/or the like. As described below, migrating data between the data repositories is done transparent to an application that is using the data such that the application is unaware that data is being moved between the data repositories 108. In one embodiment, the data repositories 108 are part of a deduplication gateway system, such as ProtecTiER® from IBM® of Armonk, N.Y.

Figure 2:
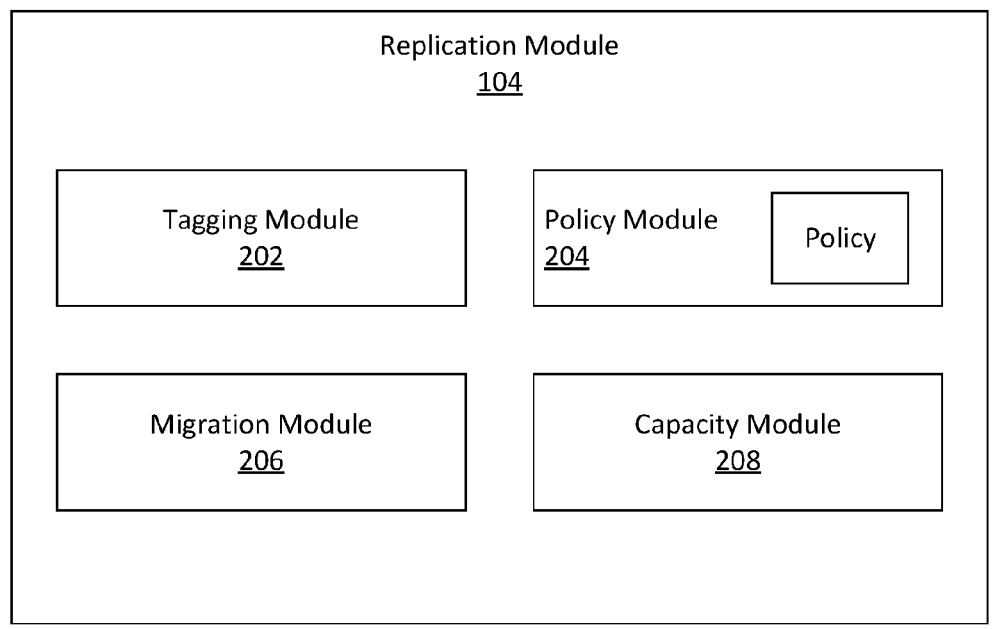
FIG. 2 is a schematic block diagram illustrating one embodiment of the replication module in accordance with embodiments of the present disclosure.

FIG. 2 is a schematic block diagram illustrating one embodiment of the replication module 104 in accordance with embodiments of the present disclosure. As discussed above, the replication module 104 is configured to manage replication of data between data repositories 108 that may be located in geographically diverse locations, and further, may include cold storage devices. The replication module 104, in one embodiment, includes one or more of a tagging module 202, a policy module 204, a migration module 206, and a capacity module 208.

The replication module 104, as described above, is configured to manage the backup of data across storage devices. These storage devices may be operational within, for example, various information handling devices 102 or within data repositories 108. The storage devices may be primary storage devices, such as solid state drives or hard disk drives, or the storage devices may be cold storage (or secondary storage) devices, such as optical disks, tape drives, or low-cost commodity hard disk drives.

The replication module 104 is configured to manage the distribution of data across the storage devices and ensure that, in some embodiments, copies of the data conform to information lifecycle management ("ILM") policies. In one embodiment, the replication module 104 is configured to prioritize replication of data between data repositories 108 before an individual data repository 108 migrates the data to a cold storage device. This is beneficial because retrieving the data from the cold storage device is often a slow, time-consuming operation. In other words, it is beneficial to wait to migrate the data to cold storage until after any replication operations have been completed. Accordingly, the replication module 104 may be configured to mark data to be replicated as "excluded" from migration to cold storage until such time as the replication is complete. The mark, or flag, may then be removed and the data migrated to cold storage. The below-described modules assist the replication module 104 in achieving this feature. In an alternative embodiment, the features of the below-described modules may be incorporated into a single module, for example, the replication module 104.

The tagging module 202, in one embodiment, tags files or objects that are scheduled, or will be scheduled, for replication to another data repository 108. The tagging module 202 marks or flags these files or objects by updating, for example, metadata, a regular attribute, or an extended file attribute that indicates that the file or object is to be excluded from migration to cold storage.

In a further embodiment, the tagging module 202 is configured to determine when a file is no longer scheduled for replication and to remove the flag or marking. In an alternative embodiment, the tagging module 202 flags the object/file to indicate that the object/file is ready for migration. Stated differently, instead of removing the flag, in one embodiment, the tagging module 202 updates the flag to indicate the object/file is ready for migration.

The policy module 204, in one embodiment, maintains various storage or information lifecycle policies corresponding to the data being processed in the replication system 100. Information lifecycle policies refer to policies that govern how a data object (e.g., file) is processed throughout the life of the object. The information lifecycle policies may be used in embodiments to identify the status of the object and to flag active, inactive, and dormant objects. The policy module 204 may also identify and flag, according to the information lifecycle policies, objects that should be migrated or archived because the objects are not regularly accessed. The policy module 204 is also configured to manage retention schedules that eventually may lead to migration of objects to cold storage.

As described above, primary and secondary storage (i.e., cold storage) used in embodiments of the replication system can vary in performance, and consequently in cost as well. In certain embodiments, efficiencies may be obtained by storing archived and low activity objects in cold storage while active and highly active case files may be stored in primary storage. This primary storage can include highly efficient storage systems using both volatile and non-volatile memory. Comparatively, in embodiments, the secondary storage may use high capacity non-volatile storage systems, including storage tape systems.

In embodiments, through active management of objects and storage location, frequently accessed objects may be channeled to high-performance storage resources while inactive or dormant or less important objects may be channeled to lower-performance storage resources. An object status may be determinative of where it is stored and whether or when it may be relocated from its current storage position. In embodiments, for example, when the access frequency goes down, objects may be channeled to normal performance storage resources or low performance storage resources and if a particular lower threshold is met, the objects may be migrated to cold storage.

In one embodiment, the policy module 204 is further configured for load balancing by identifying which node (e.g., data repository 108 of FIG. 1) is to receive a copy of the object. For example, in an embodiment with three or more geographically diverse data repositories 108, the policy module 204 may require that a copy of the object is maintained in each data repository. Further, the policy module 204 may require that at least two of the three data repositories 108 store the copy of the object in primary storage with the third storing the object in cold storage.

In another embodiment, the policy module 204 is configured with policies that require "eventual consistency" of data. In other words, the replication system 100 receives an object to be replicated, and the replication module 104 may be configured to replicate a new file, eventually, to all nodes or data repositories 108. Other data consistency rules or models may also be employed. One of skill in the art will recognize that the lifecycle management policies may be tailored to fit the needs of the organization that is utilizing the replication system 100.

Although replication of data is discussed herein with reference to "objects" and "files", one of skill in the art will recognize that the information lifecycle policies may instead be applied to portions of objects (i.e., chunks of data) which are then spread across geographically diverse nodes. As used herein, "geographically diverse" refers to nodes that are geographically dispersed, or in other words, the nodes are not located within the same facility. It may also refer to nodes that are not located within the same city, state, or even continent.

One such example of geographic replication is known as geo-erasure replication where smaller chunks are written across different geographic regions in an erasure coded manner.

The migration module 206, in one embodiment, is configured to transfer data between data repositories 108. In a further embodiment, the migration module 206 is configured to transfer data between primary storage and cold storage in accordance with the embodiments described above. The migration module 206 may be configured to monitor the file attributes of an object and determine whether the object should be migrated to cold storage, maintained in primary storage, replicated to another node, or disposed of. For example, the migration module 206 may be configured to examine the metadata, regular file attribute, or extended file attribute of an object to determine if the tagging module 202 has marked the object as excluded from migration. Accordingly, the migration module 206 is configured to maintain the object in primary storage until such point as the exclusion tag is removed.

In one embodiment, the migration module 206 migrates an object or data segment in a compressed format. In an alternative embodiment, the object is transmitted in an uncompressed format. In some embodiments, the migration module 206 receives objects from a host (e.g., a server or other information handling device) and migrates the objects to other data repositories 108 over the data network 106.

In some embodiments, the migration module 206 utilizes various application programming interfaces ("APIs") to migrate data segments, files, objects, or the like, between the data repositories 108. For example, the migration module 206 may use representational state transfer ("REST") APIs to PUT or GET data segments. Other APIs may be provided to incorporate remote or "hybrid cloud" data repositories by the provider of the remote data repository, such as Amazon® or Rackspace®.

After the migration module 206 migrates data segments to cold storage, the one or more entities (i.e., information handling device) that are associated with the data may have data stored in various geographically diverse data repositories 108, utilizing both primary storage and cold storage devices. However, the distinction is transparent to an application of the information handling device using the data and/or an entity that refers to the data such that the application or entity is not aware of where the data is stored.

The capacity module 208, in one embodiment, is configured to monitor the storage capacity of storage devices within a data repository 108. The capacity module 208 is further configured to determine if a storage capacity threshold has been reached, and in response to the threshold being reached, override the flag or marking that excludes a file or object from migration to cold storage. This beneficially allows the system 100 to free up storage space in the event that storage devices are operating at nearly full capacity. When overriding the migration-exclusion tags, objects may be temporarily migrated to cold storage in a collocated manner. In this embodiment, the migration module 206 migrates the objects to a single cold storage device so that the object may be sequentially read from, for example, the tape in order to complete a replication task, which optimizes the tape recall activity.

Figure 3:
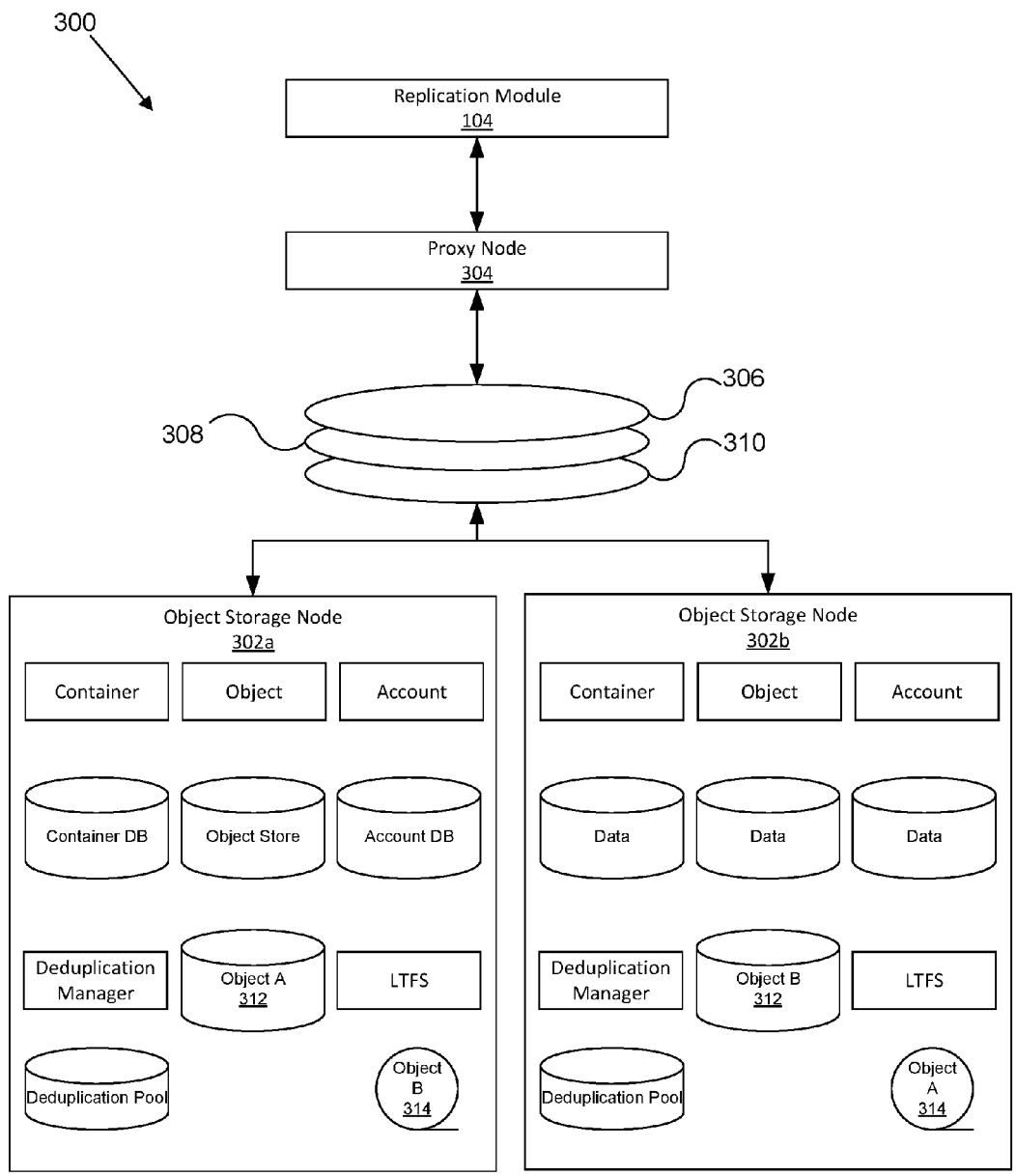
FIG. 3 is a schematic block diagram illustrating another embodiment of a replication gateway system utilizing cold storage devices in accordance with embodiments of the present disclosure.

FIG. 3 is a schematic block diagram illustrating another embodiment of a replication gateway system 300 utilizing cold storage devices in accordance with embodiments of the present disclosure. In the depicted embodiment, a replication module 104 operates as a gateway to one or more data repositories, or, as depicted here object storage nodes 302. For clarity, only two object storage nodes 302a, 302b (and collectively referred to as "object storage nodes 302") are depicted, however, it is contemplated that a replication gateway system 300 may utilize as many object storage nodes 302 as are necessary.

In the depicted embodiment, the replication gateway system 300 may be implemented as an Openstack® system from IBM® of Armonk, N.Y. There are two main concepts in an Openstack® system: objects and containers. An object includes the content and any optional metadata associated with the files stored in the system 300. Objects may be spread across multiple storage devices in the object storage nodes 302. A container is similar in concept to a folder in that it is a storage compartment for a set of files.

In this embodiment, the replication module 104 operates as a load balancing gateway to the object storage nodes, and may communicate with the object storage nodes 302 via a proxy node 304. The proxy node 304 presents a unified interface to the remainder of the storage architecture. The proxy node 304 accepts requests to create containers, upload files, or modify metadata and can also provide container listings or present stored files. When the proxy node 304 receives a request, it determines the location of an account, container, or object in a ring and forwards the request to the relevant server. Rings contain mappings of logical names to physical locations. In one embodiment, the system 300 includes an account ring 306, a container ring 308, and an object ring 310. Accounts, containers, and objects are assigned with separate rings, the ring 306, 308, 310 describes this mapping in terms of devices, partitions, replicas, and zones. In other embodiments, the replication module 104 may query each object storage node 302 to determine where an object is stored, and the type of storage that is being used to store the object.

Each object storage node 302 contains various components, modules, databases, and storage devices for carrying out the functions of object storage. These components, modules, databases and devices may include, but are not limited to, contains, objects, accounts, and their corresponding databases, a deduplication manager and its pool, a primary storage device 312, a cold storage manager (depicted here as a linear tape file system "LTFS" manager), and a cold storage device 314 (e.g., tape storage device).

The depicted embodiment is an illustration of an implementation of the above described lifecycle management policy of storing a copy of an object in a first node in primary storage and a second copy of the same object in cold storage. In the depicted embodiment, "Object A" is stored in primary storage 312 (i.e., high performance storage) of object storage node 302a, and in cold storage 314 of object storage node 302b. Similarly, "Object B" is stored in primary storage of object storage node 302b and in cold storage 314 of object storage node 302a. The above described exclusion-from-migration tagging may be used to prevent Object A from being migrated to cold storage in the object storage node 302a, while migration to cold storage is allowed in object storage node 302b.

The replication module 104 may be configured to perform a GET request of Object A from the node that stores Object A in primary storage, or in this example, object storage node 302a. This beneficially enables disk speed based retrieval of Object A during a GET operation. Additionally, the replication module 104 may be configured to balance placement of objects evenly between multiple object storage nodes according to above described policies.

Figure 4:
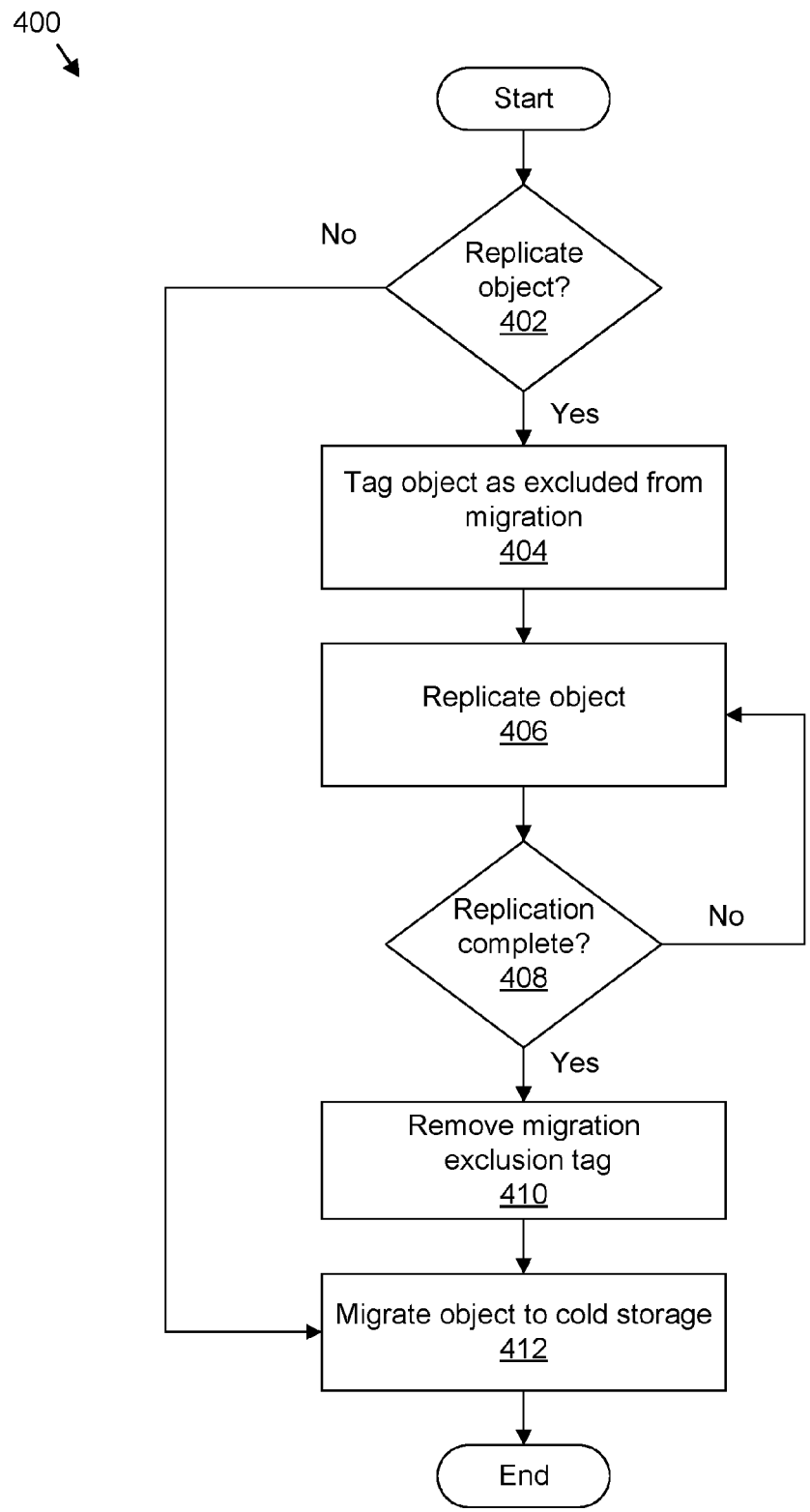
FIG. 4 is a flow chart diagram illustrating one embodiment of migration exclusion tagging in accordance with embodiments of the present disclosure.

FIG. 4 is a flow chart diagram illustrating one embodiment of migration exclusion tagging 400 in accordance with embodiments of the present disclosure. The method 400 may be performed by processing logic that may comprise hardware (e.g., circuitry, dedicated logic, programmable logic, microcode, etc.) software (such as instructions run on a processing device), firmware, or a combination thereof. In one embodiment, the method 400 is performed by the replication module 104 of FIG. 1.

The method starts and the processing logic, at block 402, determines if an object is to be replicated. In one embodiment, the determination to replicate an object comprises the processing logic determining if a received object has already been replicated, and if so, if the received object is different from the object that has already been replicated. If the processing logic determines that the object does not need replication, the processing logic, at block 412, migrates the object to cold storage.

If, however, the processing logic determines at block 402 to replicate the object, the processing logic tags, at block 404, the object as excluded from migration. In one embodiment, the processing logic updates an attribute of the object with a tag, flag, or value that is indicative of being excluded from migration. The value may be part of the object metadata, the regular file attributes, or extended file attributes.

The processing logic, at block 406, replicates the object. In one embodiment, the processing logic replicates the object by transmitting a copy of the object from a source data repository (or object storage node) to a target data repository.

At decision block 408, the processing logic determines if the replication is complete. If the replication is not complete, the processing logic returns to block 406 until the replication completes. If the replication is complete, the processing logic removes, at block 410, the migration-exclusion tag and migrates, at block 412, the object to cold storage. The method 400 then ends.

Figure 5:
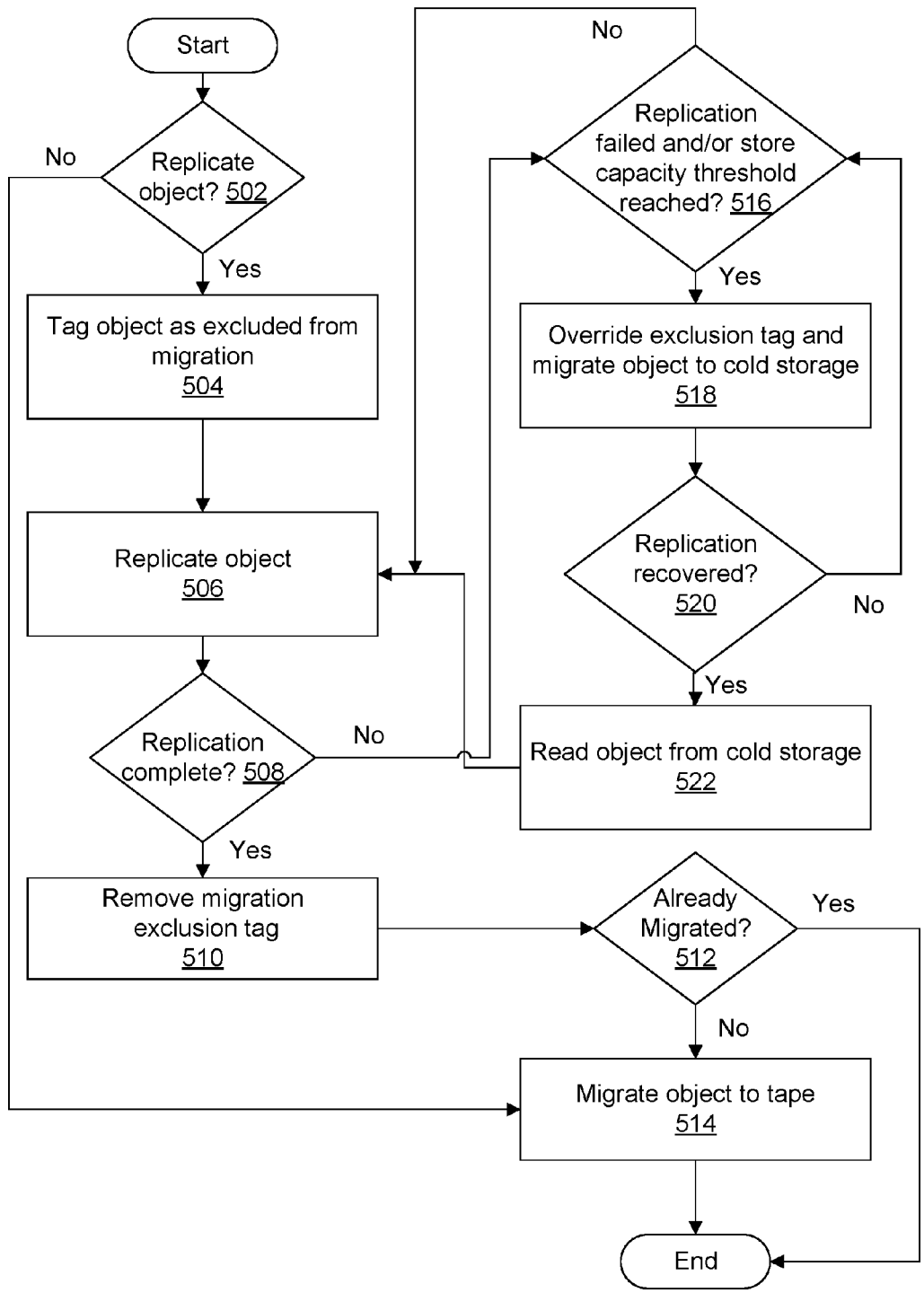
FIG. 5 is a flow chart diagram illustrating one embodiment of migration exclusion tagging in accordance with embodiments of the present disclosure.

FIG. 5 is a flow chart diagram illustrating one embodiment of migration exclusion tagging 500 in accordance with embodiments of the present disclosure. The method 500 may be performed by processing logic that may comprise hardware (e.g., circuitry, dedicated logic, programmable logic, microcode, etc.) software (such as instructions run on a processing device), firmware, or a combination thereof. In one embodiment, the method 400 is performed by the replication module 104 of FIG. 1.

The method starts and the processing logic, at block 502, determines if an object is to be replicated. In one embodiment, the determination to replicate an object comprises the processing logic determining if a received object has already been replicated, and if so, if the received object is different from the object that has already been replicated. In an alternative embodiment, all received objects are replicated, and therefore all received objects are initially tagged as excluded from migration. If the processing logic determines that the object does not need replication, the processing logic, at block 514, migrates the object to cold storage.

If, however, the processing logic determines at block 502 to replicate the object, the processing logic tags, at block 504, the object as excluded from migration. In one embodiment, the processing logic updates an attribute of the object with a tag, flag, or value that is indicative of being excluded from migration. The value may be part of the object metadata, the regular file attributes, or extended file attributes.

The processing logic, at block 406, replicates the object. In one embodiment, the processing logic replicates the object by transmitting a copy of the object from a source data repository (or object storage node) to a target data repository. At decision block 508, the processing logic determines if the replication is complete. If the replication is complete, the processing logic removes, at block 510, the migration-exclusion tag. The processing logic then determines, at block 512 if the object has previously been migrated to cold storage, and if not, migrates, at block 514, the object to cold storage. If the same object is already stored in cold storage, the method 500 ends.

If, however, at block 508, the processing logic determines that the replication is not complete for some reason, the processing logic proceeds to determine, at block 516, what is causing the replication to fail. For example, the storage capacity of the primary storage devices may have reached a threshold. If the storage capacity has not been reached, and/or the replication has not yet failed, the processing logic returns to block 506 and proceeds as described above.

If at block 516, the processing logic determines that replication has failed due to a storage capacity issue, the processing logic, at block 518, overrides the migration-exclusion tag and migrates the object to cold storage. In one embodiment, the processing logic migrates the object to cold storage in a sequential manner to optimize the subsequent cold storage recall activity.

At block 520, the processing logic determines if replication has recovered. For example, a temporary connectivity issue may have been resolved, storage capacity may have been freed up due to other objects having been migrated to cold storage, etc. If replication has recovered, the processing logic retrieves the object from cold storage, at block 522, and the processing logic proceeds to block 506 as described above. If replication has not recovered, the processing logic returns to block 516 and proceeds as described above. The method 500 ends when the object is migrated to cold storage, or a determination is made that the object has already been migrated.

Figure 6:
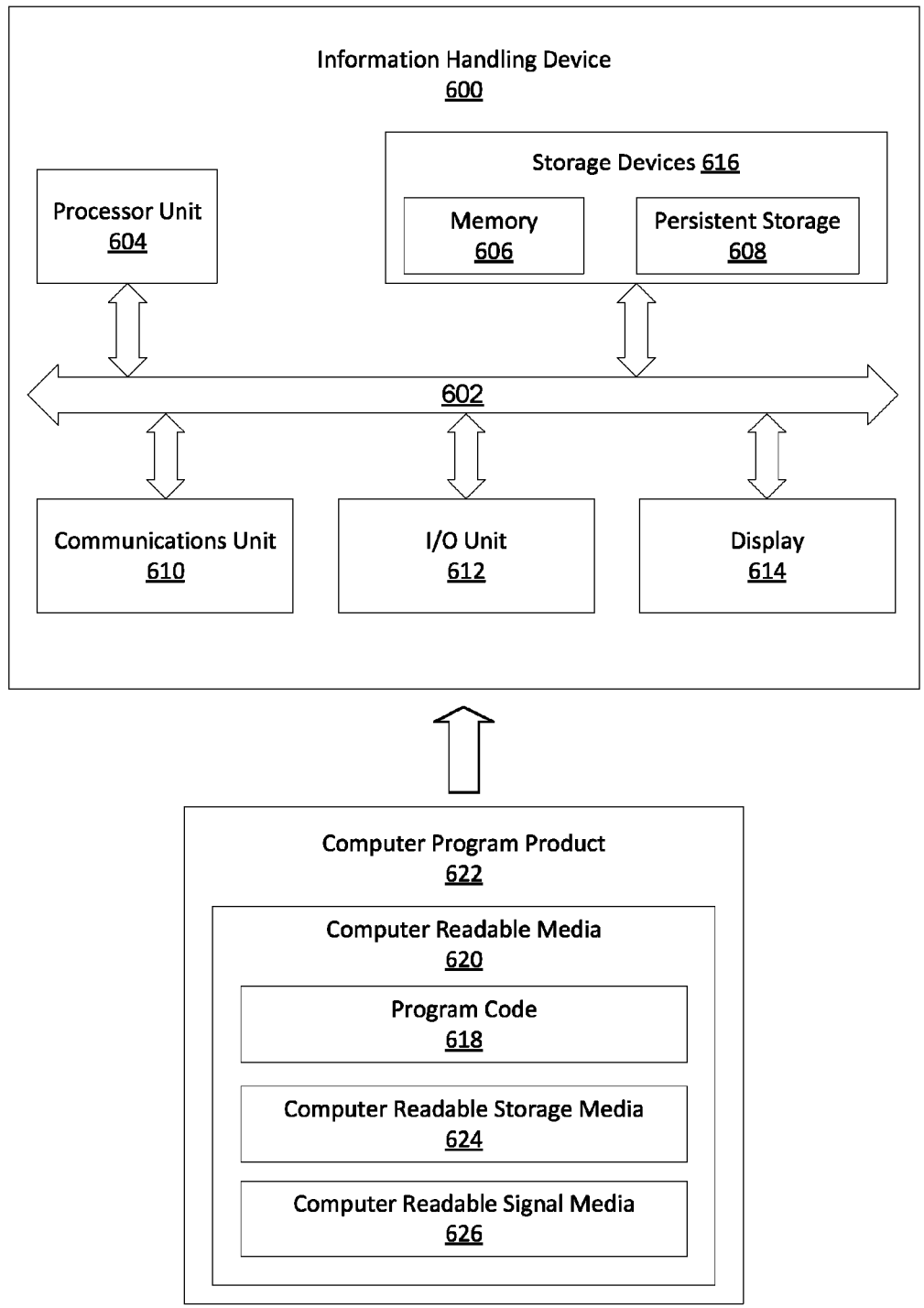
FIG. 6 is a schematic block diagram illustrating one embodiment of an information handling device in accordance with embodiments of the present disclosure.

FIG. 6 is a schematic block diagram illustrating one embodiment of an information handling device in accordance with embodiments of the present disclosure. The information handling system 600 is an example of a computer, which may be used to implement one or more components of embodiments of the invention such as the replication module 104, and in which computer usable program code or instructions implementing the processes may be located for the illustrative embodiments. In this illustrative example, the information handling system includes communications fabric 602, which provides communications between a processor unit 604, memory 606, persistent storage 608, communications unit 610, input/output (I/O) unit 612, and display 614.

The processor unit 604 serves to execute instructions for software that may be loaded into memory 606. The processor unit 604 may be a set of one or more processors or may be a multi-processor core, depending on the particular implementation. Further, the processor unit 604 may be implemented using one or more heterogeneous processor systems, in which a main processor is present with secondary processors on a single chip. As another illustrative example, the processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Memory 606, in these examples, may be, for example, a random access memory, or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

The communications unit 610, in these examples, provides for communication with other data processing systems or devices. In these examples, the communications unit 610 is a network interface card. The communications unit 610 may provide communications through the use of either or both physical and wireless communications links.

The input/output unit 612 allows for the input and output of data with other devices that may be connected to data processing system 600. For example, the input/output unit 612 may provide a connection for user input through a keyboard, a mouse, and/or some other suitable input device. Further, the input/output unit 612 may send output to a printer. The display 614 provides a mechanism to display information to a user.

Instructions for the operating system, applications, and/or programs may be located in the storage devices 616, which are in communication with the processor unit 604 through the communications fabric 602. In these illustrative examples, the instructions are in a functional form on persistent storage 608. These instructions may be loaded into memory 606 for execution by the processor unit 604. The processes of the different embodiments may be performed by the processor unit 604 using computer implemented instructions, which may be located in a memory, such as the memory 606.

These instructions are referred to as program code, computer usable program code, or computer readable program code that may be read and executed by a processor in the processor unit 604. The program code, in the different embodiments, may be embodied on different physical or computer readable storage media, such as the memory 606 or the persistent storage 608.

Program code 618 is located in a functional form on computer readable media 620 that is selectively removable and may be loaded onto or transferred to the information handling device 600 for execution by the processor unit 604. The program code 618 and computer readable media 620 form computer program product 622. In one example, the computer readable media 620 may be a computer readable storage media 624 or a computer readable signal media 626. The computer readable storage media 624 may include, for example, an optical or magnetic disc that is inserted or placed into a drive or other device that is part of the persistent storage 608 for transfer onto a storage device, such as a hard drive, that is part of the persistent storage 608. The computer readable storage media 624 also may take the form of a persistent storage, such as a hard drive, a thumb drive, or a flash memory that is connected to information handling device 600. In some instances, the computer readable storage media 624 may not be removable from the information handling device 600.

Alternatively, the program code 618 may be transferred to the information handling device 600 using computer readable signal media 526. Computer readable signal media 626 may be, for example, a propagated data signal containing program code 618. For example, the computer readable signal media 626 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, the program code 618 may be downloaded over a network to the persistent storage 608 from another device or data processing system through the computer readable signal media 626 for use within the information handling device 600. For instance, program code stored in a computer readable storage media in a server data processing system may be downloaded over a network from the server to the information handling device 600. The system providing the program code 618 may be a server computer, a client computer, or some other device capable of storing and transmitting program code 618.

The different components illustrated for the information handling device 600 are not meant to provide physical or architectural limitations to the manner in which different embodiments may be implemented. The different illustrative embodiments may be implemented in an information handling device including components in addition to and/or in place of those illustrated for the information handling device 600. Other components shown in FIG. 6 can be varied from the illustrative examples shown. The different embodiments may be implemented using any hardware device or system capable of executing program code. For example, a storage device in the information handling device 600 is any hardware apparatus that may store data. The memory 606, persistent storage 608, and the computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, the memory 606 or a cache such as found in an interface and memory controller hub that may be present in the communications fabric 602.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a replication module configured for replicating, in response to a determination that a received object corresponds to a storage policy, the received object to a data storage node;
   a tagging module configured for marking the received object with a file attribute indicative of the received object being excluded from migration to a cold storage device during the replicating such that the received object is copied from a primary storage device and maintained in the primary storage device, and removing the file attribute in response to the replicating completing; and
   a migration module configured for migrating, in response to a determination that the file attribute has been removed, the received object to the cold storage device such that the received object is copied to the cold storage device and no longer maintained in the primary storage device;
   wherein at least a portion of the replication module, the tagging module, and the migration module comprises one or more of hardware and software, the software being stored on one or more computer readable storage media.

2. The apparatus of claim 1, where the data storage node comprises a plurality of data storage nodes, where each of the plurality of data storage nodes comprises at least one cold storage device and at least one primary storage device.

3. The apparatus of claim 2, where at least two of the plurality of data storage nodes are geographically diverse.

4. The apparatus of claim 2, further comprising a capacity module configured for determining a storage capacity of the primary storage device, and determining when a storage capacity threshold is reached.

5. The apparatus of claim 4, where the replication module is further configured for overriding, in response to a determination that the storage capacity threshold is reached, the file attribute that is indicative of the received object being excluded from migration, and migrating the received object to cold storage.

6. The apparatus of claim 5, where the migration module is further configured for migrating, in response to the overriding, the received object sequentially to at least one of the cold storage devices.

7. The apparatus of claim 6, where the migration module is further configured for retrieving the received object from the at least one cold storage device in response to a determination that the storage capacity is below the storage threshold.

8. The apparatus of claim 2, where the replication module is further configured for maintaining a first copy of the received object in at least one primary storage device of a first node of the plurality of data storage nodes, and a second copy of the received object in at least one cold storage device of a second node of the plurality of data storage nodes.

9. A method for data replication performed on at least one computing device, where the computing device includes a processor and a memory, the method comprising:
   replicating, in response to a determination that a received object corresponds to a storage policy, the received object to a data storage node;
   marking the received object with a file attribute indicative of the received object being excluded from migration to a cold storage device during the replicating such that the received object is copied from a primary storage device and maintained in the primary storage device, and removing the file attribute in response to the replicating completing; and
   migrating, in response to a determination that the file attribute has been removed, the received object to the cold storage device such that the received object is copied to the cold storage device and no longer maintained in the primary storage device.

10. The method of claim 9, where the data storage node comprises a plurality of data storage nodes, where each of the plurality of data storage nodes comprises at least one cold storage device and at least one primary storage device.

11. The method of claim 10, further comprising determining a storage capacity of the primary storage device, and determining when a storage capacity threshold is reached.

12. The method of claim 11, further comprising overriding, in response to a determination that the storage capacity threshold is reached, the file attribute that is indicative of the received object being excluded from migration, and migrating the received object to cold storage.

13. The method of claim 12, further comprising migrating, in response to the overriding, the received object sequentially to at least one of the cold storage devices.

14. The method of claim 13, further comprising retrieving the received object from the at least one cold storage device in response to a determination that the storage capacity is below the storage threshold.

15. The method of claim 10, further comprising maintaining a first copy of the received object in at least one primary storage device of a first node of the plurality of data storage nodes, and a second copy of the received object in at least one cold storage device of a second node of the plurality of data storage nodes.

16. At least one computer storage device storing computer-executable instruction that, when executed by a processor of a computing device that includes a memory, cause the computing device to perform actions comprising:
   replicating, in response to a determination that a received object corresponds to a storage policy, the received object to a data storage node;
   marking the received object with a file attribute indicative of the received object being excluded from migration to a cold storage device during the replicating such that the received object is copied from a primary storage device and maintained in the primary storage device, and removing the file attribute in response to the replicating completing; and
   migrating, in response to a determination that the file attribute has been removed, the received object to the cold storage device such that the received object is copied to the cold storage device and no longer maintained in the primary storage device.

17. The at least one computer storage device of claim 16, where the data storage node comprises a plurality of data storage nodes, where each of the plurality of data storage nodes comprises at least one cold storage device and at least one primary storage device.

18. The at least one computer storage device of claim 17, where the actions further comprise maintaining a first copy of the received object in at least one primary storage device of a first node of the plurality of data storage nodes, and a second copy of the received object in at least one cold storage device of a second node of the plurality of data storage nodes.

19. The at least one computer storage device of claim 17, where the actions further comprise determining when replicating has failed.

20. The at least one computer storage device of claim 19, where the actions further comprise overriding, in response to a determination that the replication has failed, the file attribute that is indicative of the received object being excluded from migration, and migrating the received object to cold storage.

* * * * *